(12) United States Patent
Chang et al.

(10) Patent No.: US 7,576,593 B2
(45) Date of Patent: Aug. 18, 2009

(54) TWO-PHASE CHARGE PUMP CIRCUIT WITHOUT BODY EFFECT

(75) Inventors: Wu-Chang Chang, Hsinchu Hsien (TW); Yin-Chang Chen, Hsinchu Hsien (TW)

(73) Assignee: Ememory Technology Inc., Hsinchu (TW)

( * ) Notice: Subject to any disclaimer, the term of this patent is extended or adjusted under 35 U.S.C. 154(b) by 0 days.

(21) Appl. No.: 12/222,811

(22) Filed: Aug. 18, 2008

(65) Prior Publication Data

US 2008/0309399 A1 Dec. 18, 2008

Related U.S. Application Data

(62) Division of application No. 11/730,955, filed on Apr. 5, 2007, now abandoned.

(51) Int. Cl.
*G05F 1/10* (2006.01)
*G05F 3/02* (2006.01)

(52) U.S. Cl. ........................ 327/536; 327/537; 363/59; 363/60

(58) Field of Classification Search .................. 327/536, 327/537; 363/59, 60
See application file for complete search history.

(56) References Cited

U.S. PATENT DOCUMENTS

| | | | | |
|---|---|---|---|---|
| 5,343,088 A * | 8/1994 | Jeon | ........................... | 327/536 |
| 5,399,928 A * | 3/1995 | Lin et al. | ..................... | 327/434 |
| 5,767,733 A * | 6/1998 | Grugett | ....................... | 327/534 |
| 5,920,225 A * | 7/1999 | Choi et al. | .................. | 327/536 |
| 5,943,226 A * | 8/1999 | Kim | ........................... | 363/60 |
| 6,424,203 B1 * | 7/2002 | Bayadroun | .................. | 327/536 |
| 6,452,438 B1 * | 9/2002 | Li | ............................... | 327/536 |
| 6,496,055 B2 * | 12/2002 | Li | ............................... | 327/536 |
| 6,642,773 B2 * | 11/2003 | Lin et al. | ..................... | 327/536 |
| 6,677,806 B2 * | 1/2004 | Bloch | ......................... | 327/536 |
| 6,686,793 B2 * | 2/2004 | Li | ............................... | 327/536 |
| 6,734,717 B2 * | 5/2004 | Min | ........................... | 327/536 |
| 6,819,162 B2 * | 11/2004 | Pelliconi | ..................... | 327/536 |
| 6,831,499 B2 * | 12/2004 | Oddone et al. | .............. | 327/536 |
| 6,878,981 B2 * | 4/2005 | Eshel | ......................... | 257/299 |
| 6,888,400 B2 * | 5/2005 | Lin et al. | ..................... | 327/536 |
| 6,914,791 B1 * | 7/2005 | Park et al. | ..................... | 363/60 |
| 6,965,263 B2 * | 11/2005 | Bringivijayaraghavan | ... | 327/537 |
| 7,026,862 B2 * | 4/2006 | Nakamura | .................. | 327/536 |
| 7,095,266 B2 * | 8/2006 | Miske | ......................... | 327/427 |
| 7,098,725 B2 * | 8/2006 | Lee | ............................ | 327/536 |
| 7,123,077 B2 * | 10/2006 | Chiu et al. | ................... | 327/536 |
| 7,301,388 B2 * | 11/2007 | Kim | ............................ | 327/536 |
| 7,342,438 B2 * | 3/2008 | Muneer et al. | .............. | 327/536 |
| 7,382,177 B2 * | 6/2008 | Cordoba et al. | ............. | 327/536 |
| 2002/0084828 A1 * | 7/2002 | Li | ............................... | 327/536 |

(Continued)

*Primary Examiner*—Lincoln Donovan
*Assistant Examiner*—Adam D Houston
(74) *Attorney, Agent, or Firm*—Bacon & Thomas, PLLC

(57) ABSTRACT

A two-phase charge pump circuit without the body effect includes a voltage boost stage, an input stage connected to the voltage boost stage, and a high-voltage generator connected to the input stage. Each of the circuits can consist of NMOS or PMOS transistors. The body of each NMOS transistor is connected to an NMOS switch. The body of each PMOS transistor is connected to a PMOS switch. By providing an appropriate driving signal to each NMOS or PMOS switch, the body of each NMOS transistor can be switched to a lower voltage level and the body of each PMOS transistor is switched to a higher voltage level. This can prevent the body effect from occurring.

5 Claims, 10 Drawing Sheets

U.S. PATENT DOCUMENTS

| | | | |
|---|---|---|---|
| 2002/0084829 A1* | 7/2002 | Li | 327/536 |
| 2006/0061410 A1* | 3/2006 | Chiu et al. | 327/536 |
| 2006/0145747 A1* | 7/2006 | Ucciardello et al. | 327/536 |
| 2006/0164155 A1* | 7/2006 | Ragone et al. | 327/536 |
| 2006/0176102 A1* | 8/2006 | Ayres et al. | 327/536 |
| 2006/0220729 A1* | 10/2006 | Kim | 327/536 |
| 2008/0001651 A1* | 1/2008 | Muneer et al. | 327/536 |
| 2008/0122812 A1* | 5/2008 | Park et al. | 345/204 |

* cited by examiner

US 7,576,593 B2

TWO-PHASE CHARGE PUMP CIRCUIT WITHOUT BODY EFFECT

This is a divisional application of U.S. patent application Ser. No. 11/730,955 filed Apr. 5, 2007.

BACKGROUND OF THE INVENTION

1. Field of the Invention

The invention relates to a two-phase charge pump circuit and, in particular, to the one in which the body of each NMOS or PMOS is independently connected to a switch in order to switch to a relative low or high voltage level at an appropriate time, preventing the body effect from occurring.

2. Description of Related Art

To reduce energy consumption, the power specification of integrated circuits (IC) is re-designed to work under a lower voltage level. For example, the IC power specification was 5 volts before. It is now reduced to 3.3 volts or even lower than 2 volts. Although using a lower voltage to supply power can reduce the energy consumption, there are still situations where larger voltages are needed. Take the flash memory as an example. It requires a larger negative voltage for erasing. The lager voltage is supplied by a charge pump circuit. Aside from outputting a negative voltage, there are also charge pump circuits that can output high-level positive voltages.

With reference to FIG. 9, U.S. Pat. No. 6,384,669 discloses a charge pump circuit consisted of NMOS transistors. The driving signal of each NMOS transistor in the circuit is given in FIG. 10. The structure of the charge pump circuit is symmetric between upper and lower portions. In this circuit, the body of each NMOS transistor is connected to the ground without any other further processing. Therefore, each NMOS transistor has an obvious body effect. Due to the existence of the body effect, a voltage to make each NMOS transistor conductive has to be even higher. Therefore, one has to take into account the voltage tolerance of the transistors.

SUMMARY OF THE INVENTION

Existing charge pump circuits cannot have effective controls over the body of each NMOS or PMOS transistor. Therefore, the body of each transistor still has the body effect. The invention solves this problem.

An objective of the invention is to provide a two-phase charge pump circuit without the body effect. The body of the NMOS transistor automatically switches to a lower voltage level, while the body of the PMOS transistor automatically switches to a higher voltage level. Therefore, the invention can prevent the body effect from occurring. To achieve the above objective, the charge pump circuit receives a set of first input signal and second input signal with opposite phases.

The charge pump circuit includes: a first voltage boost stage, a second voltage boost stage, an input stage, and a high-voltage generator.

The first voltage boost stage includes a first PMOS charge transistor that has a body, a gate, a first terminal, and a second terminal. The body is connected to two switches. The first terminal and the second terminal thereof are connected to a first control node and an input node, respectively.

The second voltage boost stage includes a second PMOS charge transistor that has a body, a gate, a first terminal and a second terminal. The body is connected with two switches. The first terminal and the second terminal thereof are connected to a second control node and the input node, respectively.

The input stage includes two NMOS charge transistors connected in series. The connecting point is an input node. The body of each NMOS charge transistor is connected with two switches. One end of the first NMOS charge transistor is connected to a third control node. One end of the second NMOS charge transistor is connected to a fourth control node.

The high-voltage generator includes two PMOS output transistors. The body of each PMOS output transistors is connected with two switches. One end of the first PMOS output transistors is connected to the third control node. One end of the second PMOS output transistor is connected to the fourth control node. The other ends of the two PMOS output transistors are connected to an output node.

The first input signal and the second input signal are provided to the first voltage boost stage and the second voltage boost stage. The two switches of the first voltage boost stage, the two switches of the second voltage boost stage, and the four switches of the input stage are controlled by the voltage on the first or second control node. The bodies of the first PMOS charge transistor and the second PMOS charge transistor are always switched to a higher voltage level. The bodies of the two NMOS charge transistors are always switched to a lower voltage level.

In another embodiment of the invention, the PMOS/NMOS transistors can be replaced by NMOS/PMOS transistors to form a charge pump circuit that provides a negative voltage output.

DETAILED DESCRIPTION OF THE PREFERRED EMBODIMENT

Figure 1:
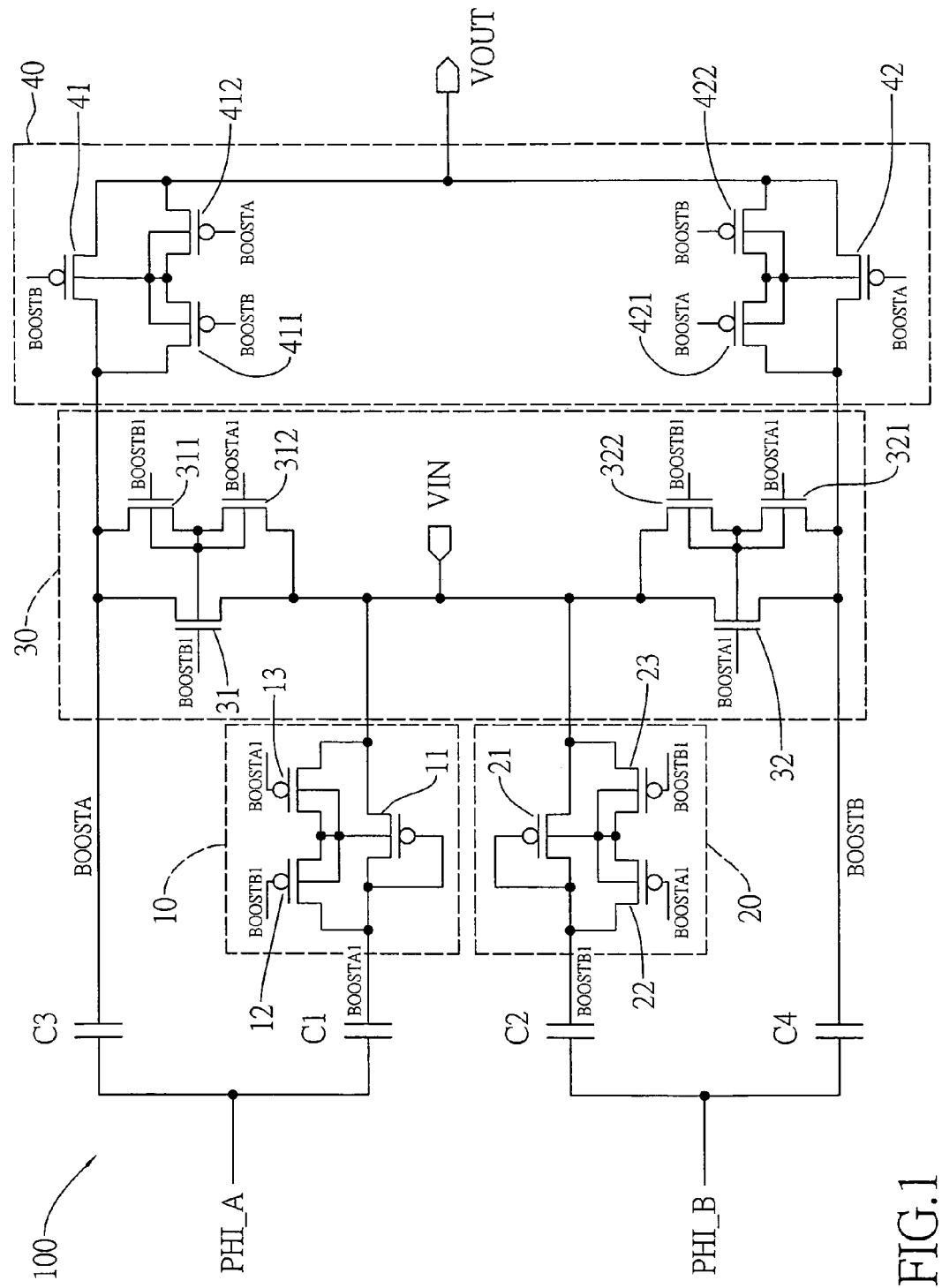
FIG. 1 is a detailed circuit of a charge pump of a first embodiment in accordance with the invention.
Figure 2:
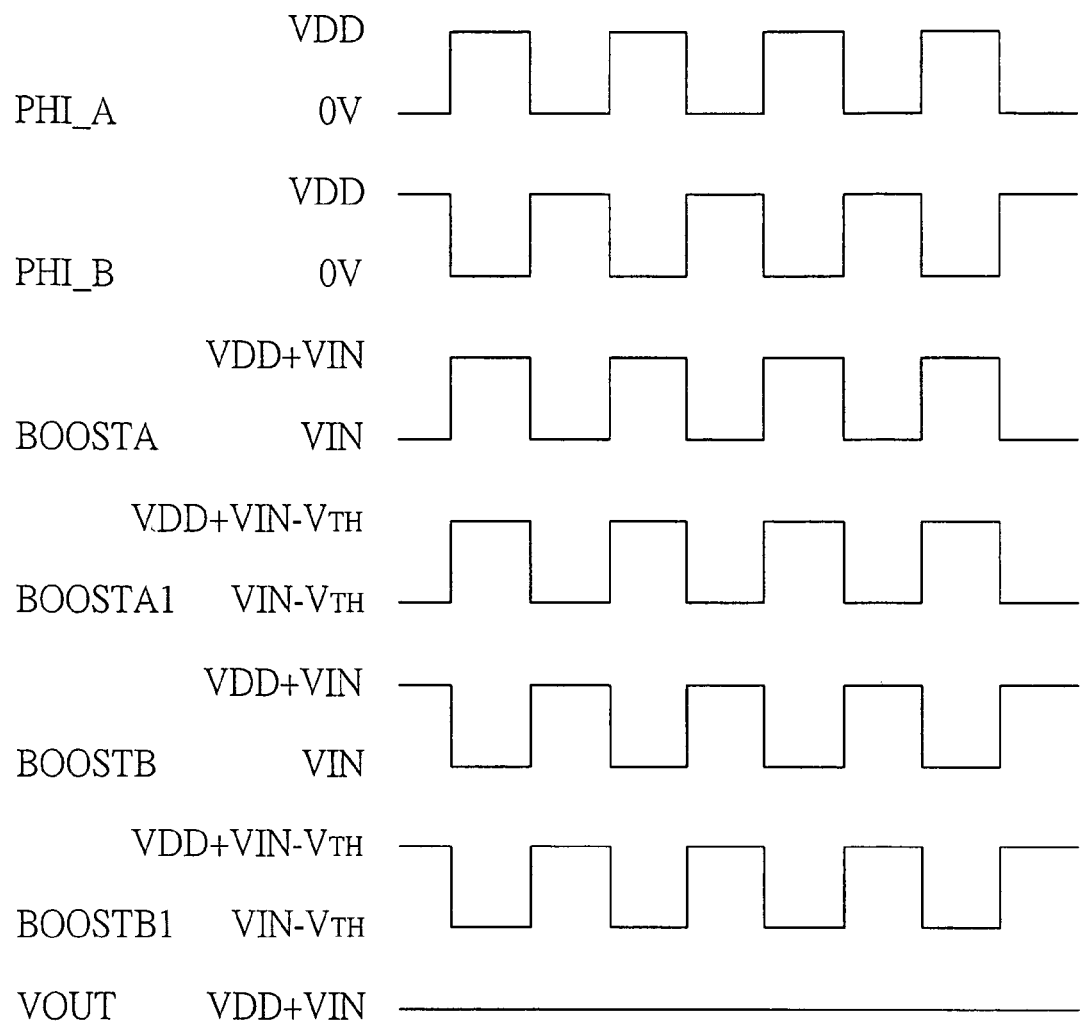
FIG. 2 shows wave forms of the circuit in FIG. 1.

With reference to FIGS. 1 and 2, a first embodiment of a single-stage charm pump circuit 100 is composed of NMOS and PMOS transistors. No particular restrictions need to be imposed on the connections of the source or drain of each transistor. The source and drain can be interchanged without affecting the spirit of the invention. Therefore, they will be referred to as the first terminal and the second terminal in the following description.

Input signals for the charge pump circuit 100 are a set of opposite-phase signals PH_A and PH_B. In this embodiment, the input signals PH_A, PH_B are non-overlap continuous square waves, with their voltage levels alternating between 0 and VDD. The charge pump circuit 100 has a symmetric structure between the upper and lower portions. The charge pump circuit 100 has a first voltage boost stage 10, a second voltage boost stage 20, an input stage 30, and a high-voltage generator 40.

The first voltage boost stage 10 is connected to the input signal PH_A via a first capacitor C1. The first voltage boost stage 10 includes a first PMOS charge transistor 11, a first switch 12, and a second switch 13. The first terminal and the gate of the first PMOS charge transistor 11 are connected to the first capacitor C1. The first switch 12 and the second switch 13 are both the PMOS transistors. The bodies of the two switches 12, 13 and their first terminals are connected to the body of the first PMOS charge transistor 11. The second terminal of the first switch 12 is connected to the first capacitor C1. The second terminal of the second switch 13 is connected to the second terminal of the first PMOS charge transistor 11.

The second voltage boost stage 20 is connected to the other input signal PH_B via the second capacitor C2. It includes a second PMOS charge transistor 21, a third switch 22, and a fourth switch 23. The first terminal and the gate of the second PMOS charge transistor 21 are connected to the second capacitor C2. The third switch 22 and the fourth switch 23 are both PMOS transistors. The bodies of the two switches 22, 23 and their first terminals are connected to the body of the second PMOS charge transistor 21. The second terminal of the third switch 22 is connected to the second capacitor C2. The second terminal of the fourth switch 23 is connected to the second terminal of the second PMOS charge transistor 21.

The input stage 30 mainly comprises a first NMOS charge transistor 31 and a second NMOS charge transistor 32 connected in series. The first terminals of the two NMOS charge transistors 31, 32 are connected to the node VIN. The node VIN is imposed with a voltage equal to or higher than VDD. The second terminal of the first NMOS charge transistor 31 is connected to the input signal PH_A via a third capacitor C3. The second terminal of the second NMOS charge transistor 32 is connected to the input signal PH_B via a fourth capacitor C4. The body of the first NMOS charge transistor 31 is also connected with a set of NMOS switches 311, 312. The bodies of the two NMOS switches 311, 312 are both connected to the body of the first NMOS charge transistor 31. One end of the switch 311 is connected to the third capacitor C3. One end of the other switch 312 is connected to the node VIN. For the second NMOS charge transistor 32, its body is connected with a set of NMOS switches 321, 322 as well. The connection method is symmetric to the two switches 311, 312 of the first NMOS charge transistor 31. Therefore, the description is not repeated here again.

The high-voltage generator 40 is connected with the input stage 30. It consists of two PMOS output transistors 41, 42. Its first terminal is connected to the first/second NMOS charge transistor 31, 32 of the input stage and the third/fourth capacitors C3, C4. The second terminals of the two PMOS output transistors 41, 42 are connected to a form a high-voltage output terminal VOUT. Each body of the two PMOS output transistors 41, 42 are provided with a set of PMOS switches 411, 412, 421, 422. The body of the first set of switches 411, 412 and the body of the first PMOS output transistor 41 are connected. The body of the second set of switches 421, 422 and the body of the second PMOS output transistor 42 are connected.

Before introducing operations of the above-mentioned circuit, the voltages on the following nodes are defined. The wave forms of the voltages on the nodes can be obtained from FIG. 2.

BOOSTA1 (first control node): This is the voltage on the node where the first PMOS charge transistor 11 and the capacitor C1 are connected in the first voltage boost stage 10.

BOOSTB1 (second control node): This is the voltage on the node where the second PMOS charge transistor 21 and the second capacitor C2 are connected in the second voltage boost stage 20.

BOOSTA (third control node): This is the voltage on the node where the first NMOS charge transistor 31 and the capacitor C3 are connected in the input stage 30.

BOOSTB (fourth control node): This is the voltage on the node where the second NMOS charge transistor 32 and the capacitor C4 are connected in the input stage 30.

The two voltages of BOOSTA1 and BOOSTB1 are used as the gate control voltages for the switches in the charge pump circuit. Take the upper portion of the circuit as an example. The gates of the first switch 12 and the second switch 13 in the first PMOS charge transistor 11 are controlled by BOOSTB1 and BOOSA1. The two NMOS switches 311, 312 connected by the first NMOS charge transistor 31 are controlled by BOOSTB1 and BOOSA1. The two PMOS switches 411, 412 in the first PMOS output transistor 41 use BOOSTB and BOOSTA as their gate control signals.

As shown in FIG. 2, the switches connected to the disclosed PMOS or NMOS transistor can automatically switch to a high or low voltage level, so that the bodies of the PMOS transistor or NMOS transistor can be continuously connected to a high or low voltage level. For the PMOS transistor, its body has to be connected to the high voltage level in the circuit, and the NMOS transistor has to be constantly connected to the low voltage level in the circuit.

I. When the input signal PH_A is a high voltage VDD, the other input signal PH_B is a low voltage 0. In this case, the voltage level at the BOOSTA node is VDD+VIN. The voltage level at the BOOSTB node is VIN. From another point of view, the voltage at BOOSTA1 is VDD+VIN−$V_{TH}$ and the voltage at BOOSTB1 is VIN−$V_{TH}$, where $V_{TH}$ is the threshold voltage of the transistor.

For the first PMOS charge transistor 11 of the first voltage boost stage 10, its first terminal has a voltage of VDD+VIN−$V_{TH}$ and its second terminal has a voltage of VIN. Therefore, the body should switch to the higher one of the two. The gate of the first switch 12 receives a voltage of VIN−$V_{TH}$, and the gate of the second switch 13 receives a voltage of VDD+VIN−$V_{TH}$. Therefore, the first switch 12 is on while the second switch 13 is off. After the first switch 12 is on, the body of the first PMOS charge transistor 11 is connected to the higher voltage level of VDD+VIN−$V_{TH}$ via the first switch 12.

For the second PMOS charge transistor 21 of the second voltage boost stage 20, its first terminal has a voltage of VIN−$V_{TH}$ while its second terminal has a voltage of VIN. So the body should switch to the higher voltage of the two, VIN. The gate of the third switch 22 receives a voltage of VDD+VIN−$V_{TH}$, and the gate of the fourth gate 23 receives a voltage of VIN−$V_{TH}$. Therefore, the third switch 22 is off and the fourth switch 23 is on. As the fourth switch 23 is on, the body of the second MOS charge transistor 21 switches to a higher voltage VIN via the fourth switch 23.

In the input stage 30, the first terminal of the first NMOS charge transistor 31 has a voltage of VIN and the second voltage has a voltage of VDD+VIN. Therefore, its body switches to the lower of the two, VIN. The gate of the NMOS switch 311 connected to the first NMOS transistor 31 is connected to the voltage of VIN−$V_{TH}$. The gate of the other NMOS switch 312 is connected to the voltage of VDD+VIN−$V_{TH}$. Therefore, only the NMOS switch 312 is on. The first NMOS transistor 31 thus switches to the lower voltage VIN.

Likewise, the second NMOS transistor 32 in the input stage 30, the first PMOS transistor 41 in the high-voltage generator 40, and the body of the second PMOS transistor can be appropriately switched to a lower or high voltage level.

II. When the input signal PH_A is a low voltage level 0, the other input signal PH_B is a high voltage level VDD. In this time sequence, the circuit action is exactly opposite to the above-mentioned stage I. Each NMOS transistor or PMOS transistor can use the correspondingly connected switch to switch to an appropriate voltage level.

Figure 3:
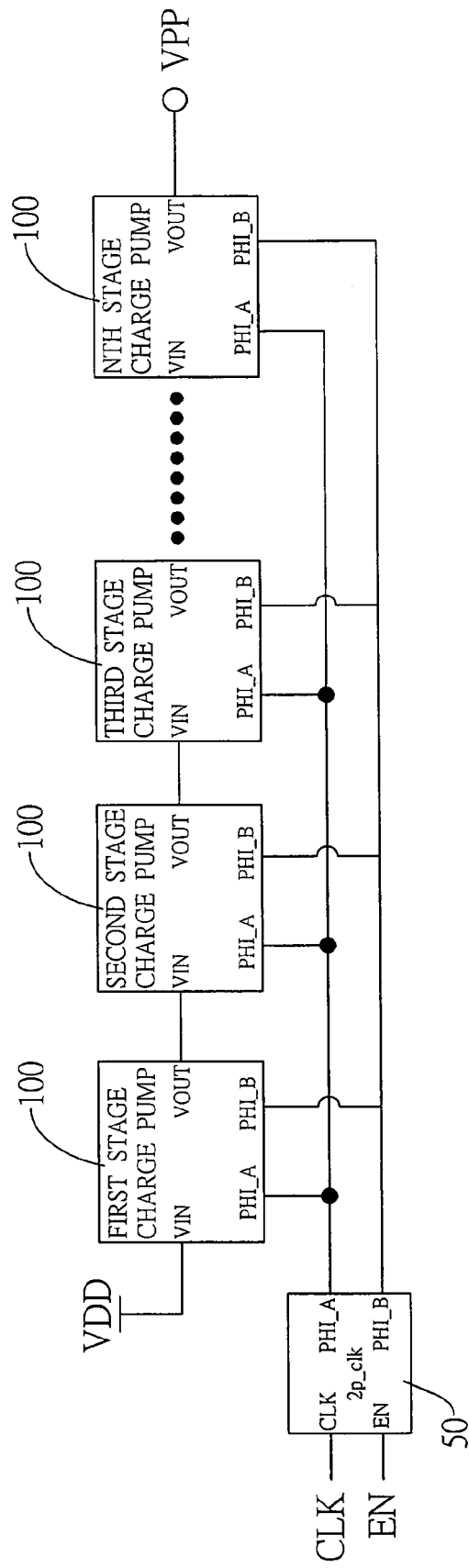
FIG. 3 is a block diagram of a multi-stage charge pump circuit comprised of many stages of the charge pump of FIG. 1 connected in series.
Figure 4:
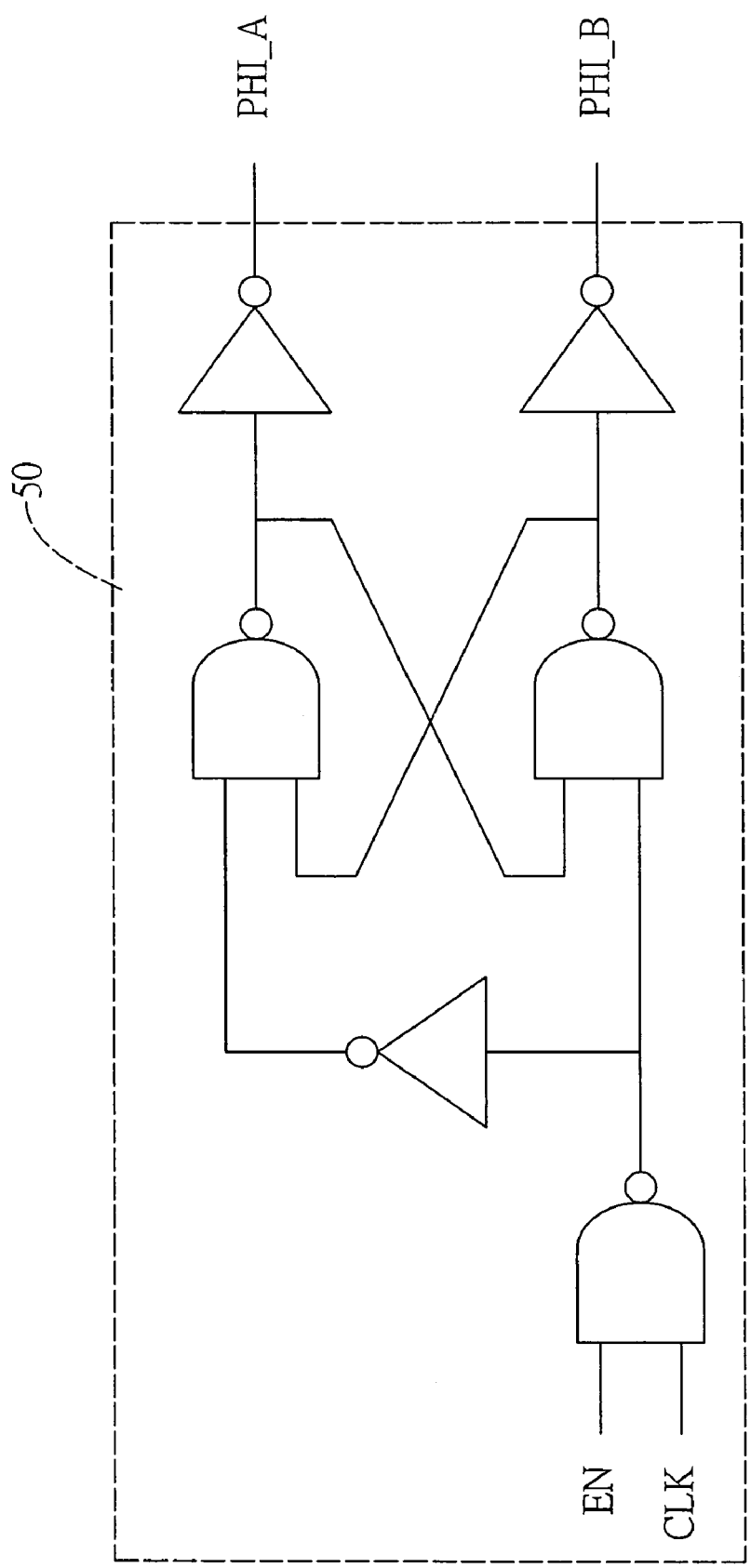
FIG. 4 is a schematic view how a logic device for generating input signal is connected according to the invention.

As shown in FIG. 3, after serially connecting several stages of the charge pump circuits 100 in FIG. 1, one obtains an even higher output voltage. Suppose N stages of charge pump circuits 100 are connected in series. The final output voltage VPP is (N+1)×VDD. The two output terminals of an input signal generating unit 50 provide the two opposite-phase input signals PH_A and PH_B to each stage of the charge pump circuits 100. As shown in FIG. 4, the input signal generating unit 50 is equivalent to an SR flip-flop.

Figure 5:
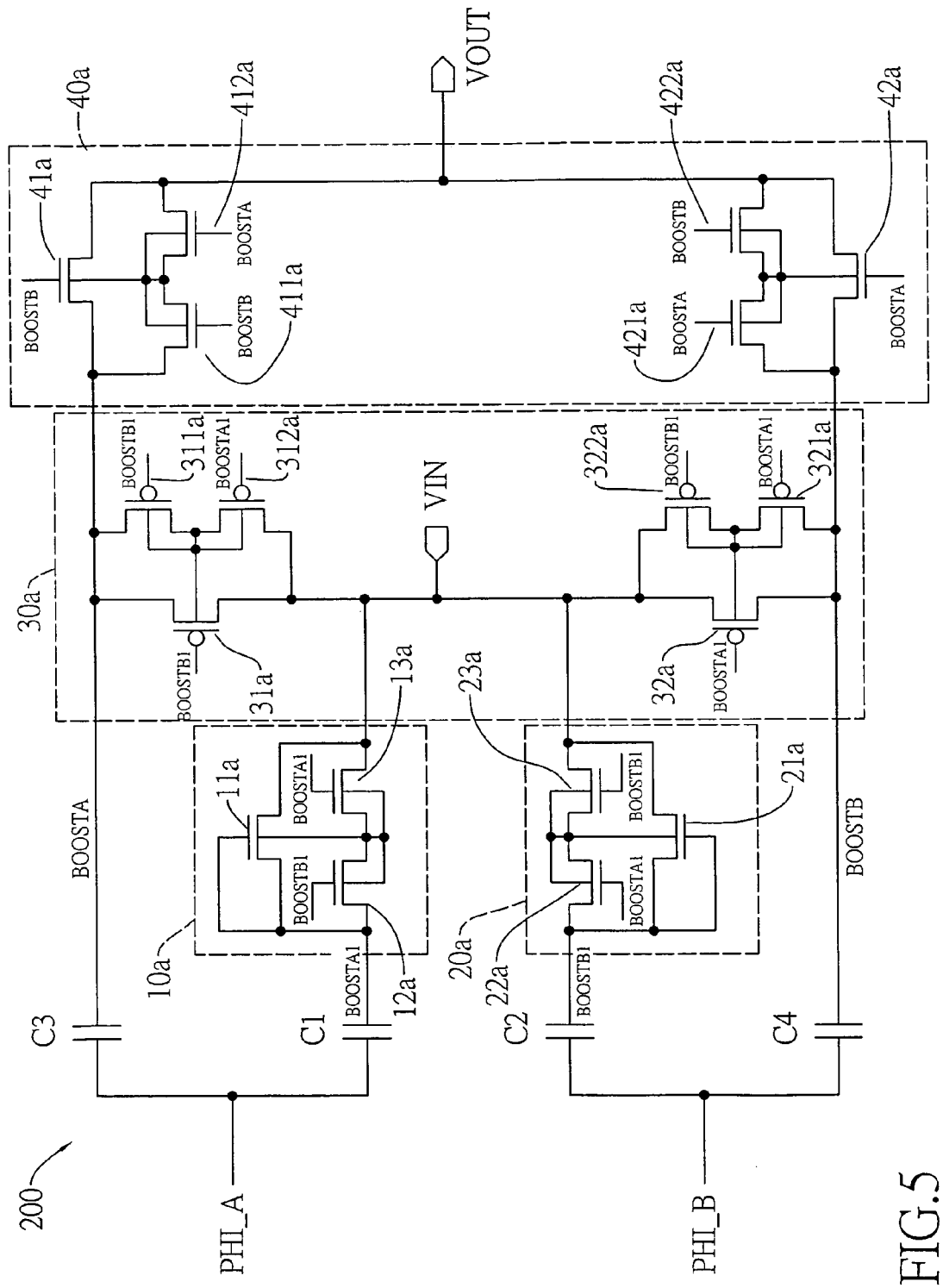
FIG. 5 is a detailed circuit of a charge pump of a second embodiment in accordance with the present invention.

Please refer to FIG. 5 for another embodiment of the disclosed single-stage charge pump circuit 200 that outputs a negative voltage. The difference between the current embodiment and the previous one is in that its first voltage dropping stage 10*a*, second voltage dropping stage 20*a*, and negative voltage generator 40*a* all comprise NMOS transistors. Therefore, the switches correspondingly connected to the NMOS transistors also comprise NMOS transistors. In particular, the device in the input stage 30*a* is replaced by PMOS transistors. The switches connected to the PMOS transistors also comprise PMOS transistors.

Using the PMOS transistor as the charge transistor in the input stage enables the single-stage charge pump circuit 200 in FIG. 5 to be a first stage charge pump circuit. However, the second, third, . . . , N-th stage circuits are preferably the one shown in FIG. 6. Each device in the charge pump circuit 300 of FIG. 6 comprises the NMOS transistor, including the input stage 30*b*. In the first voltage dropping stage 10*b*, a third NMOS discharge transistor 14*b* is inserted between the first capacitor C1 and the node VIN, in addition to the original first NMOS discharge transistor 11*b*. Its body is connected to the first switch 12*b* and the second switch 13*b*. The gate of the NMOS discharge transistor 14*b* is connected to a second capacitor C2, controlled by the voltage signal BOOSTB1. In the second voltage dropping stage 20*b*, a fourth NMOS discharge transistor 24*b* is connected between the capacitor C2 and the node VIN as well. The gate of the NMOS transistor 24*b* is connected to the capacitor C1, controlled by the voltage signal BOOSTA1. The control signals for FIGS. 5 and 6 are shown in FIG. 7.

Figure 6:
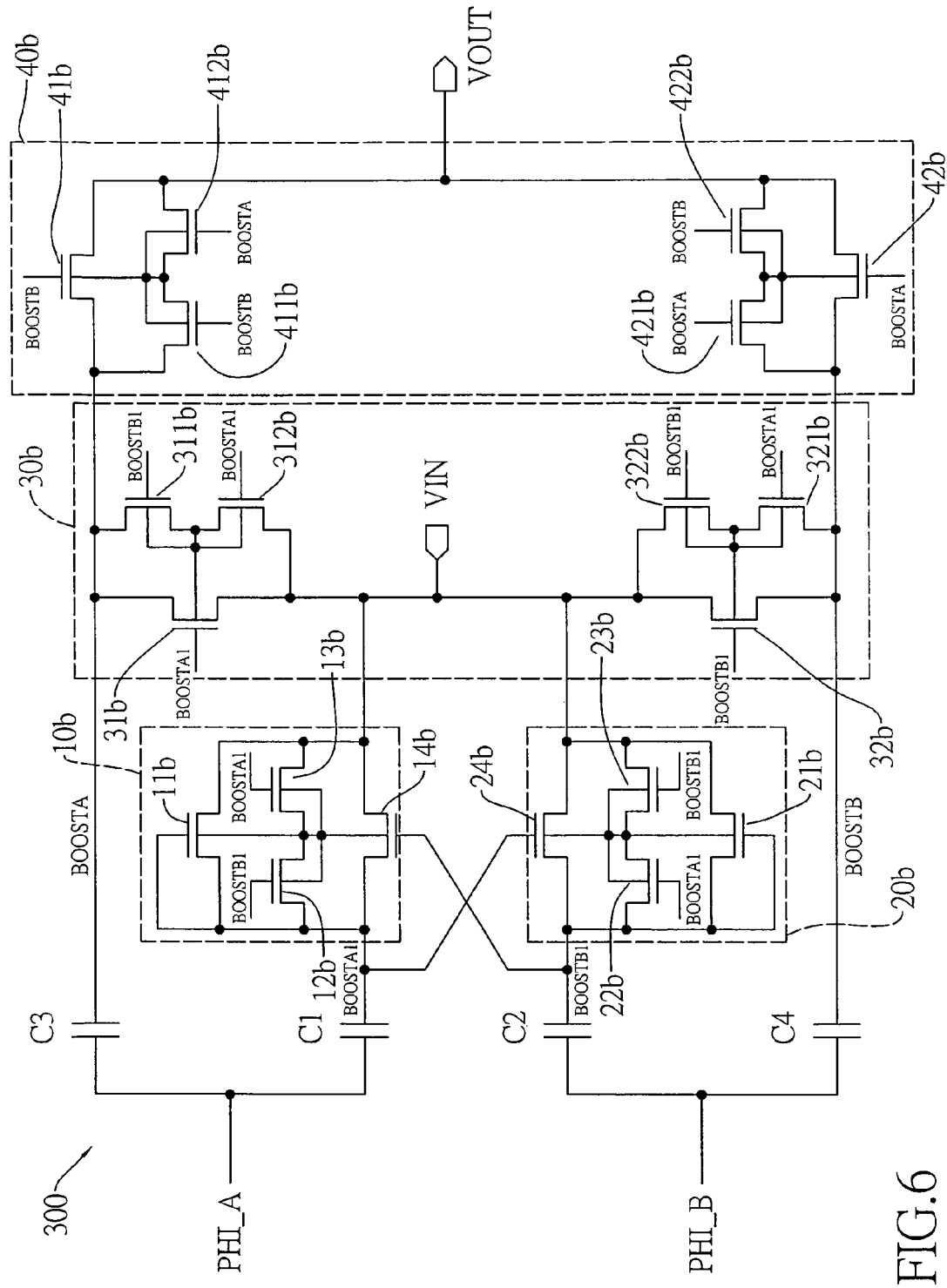
FIG. 6 is a detailed circuit of a charge pump of a third embodiment in accordance with the present invention.
Figure 7:
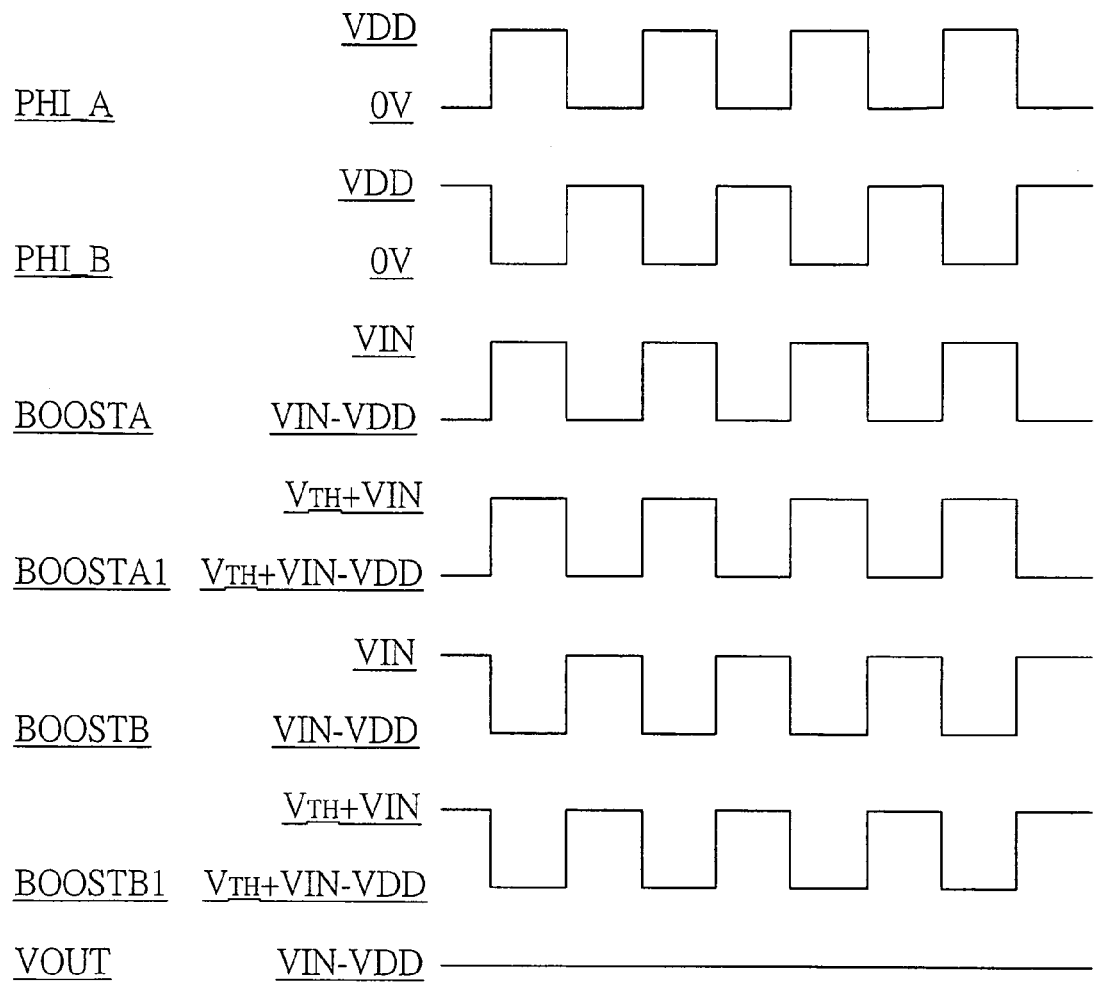
FIG. 7 shows the working wave forms of the circuits in FIGS. 5 and 6.
Figure 8:
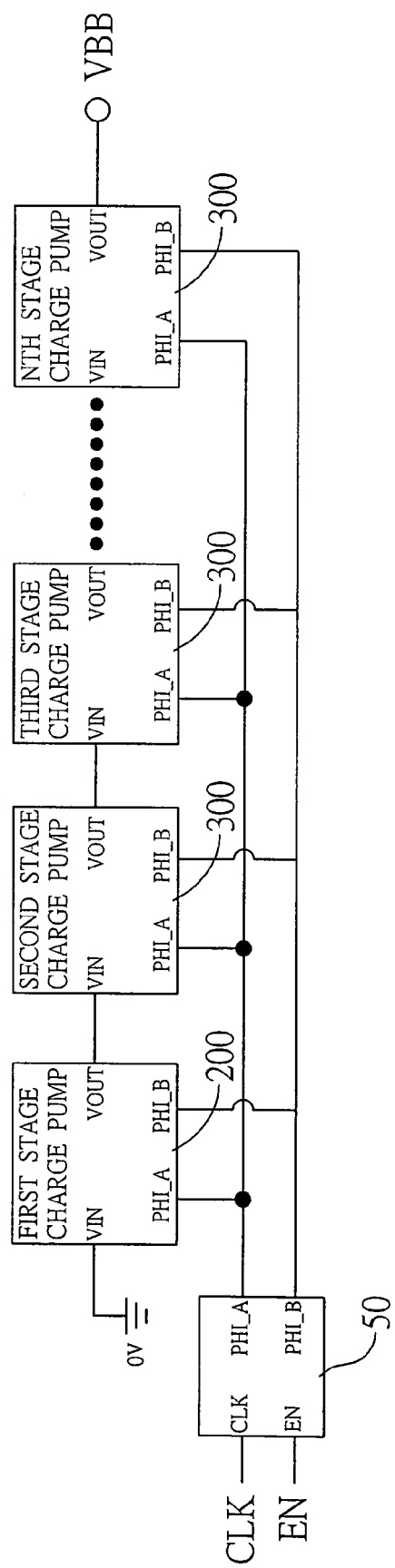
FIG. 8 is a block diagram of a multi-stage charge pump circuit comprised of many stages of the charge pump circuits of FIGS. 5 and 6 connected in series.
Figure 9:
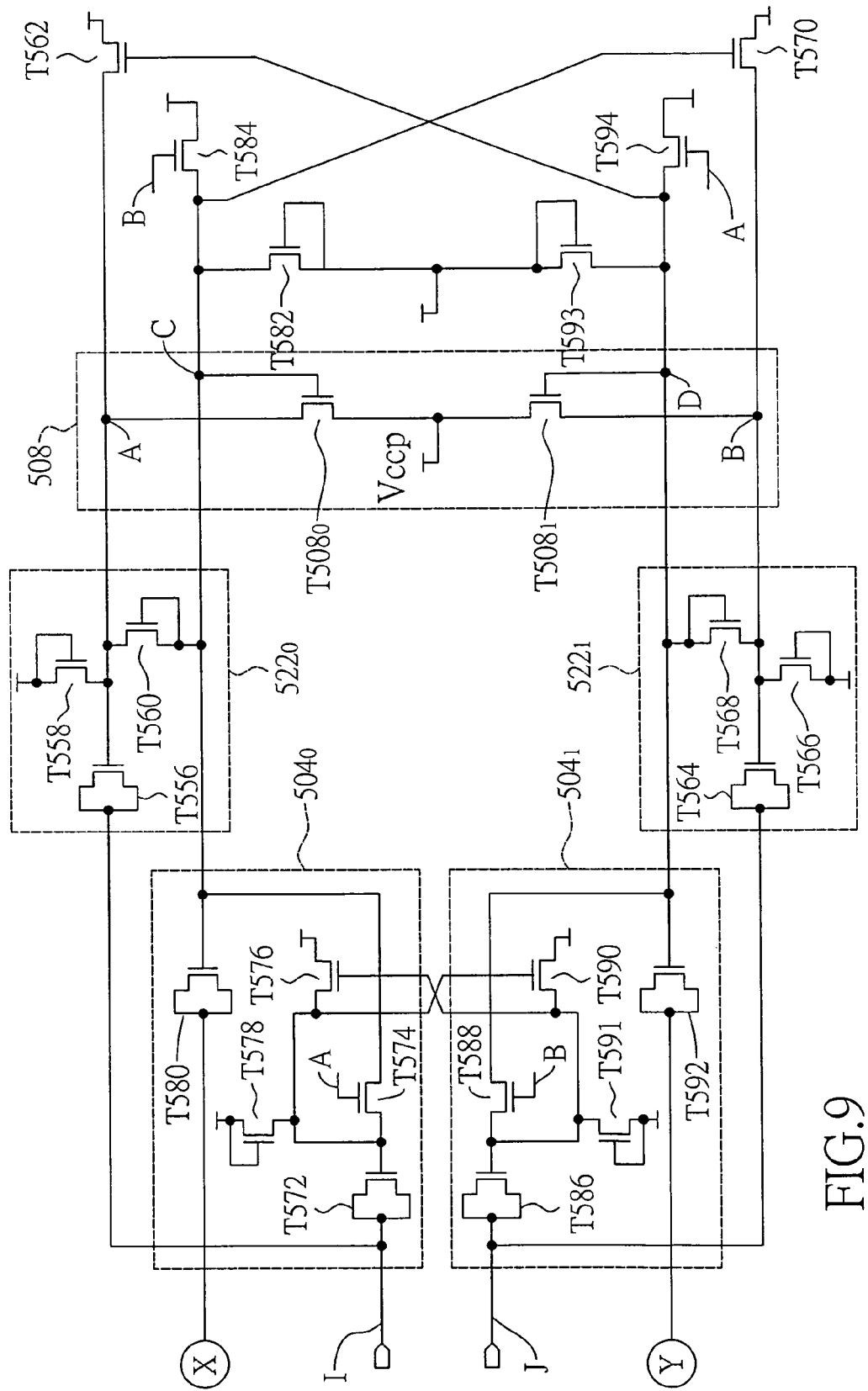
FIG. 9 is a detailed circuit of a conventional charge pump circuit.
Figure 10:
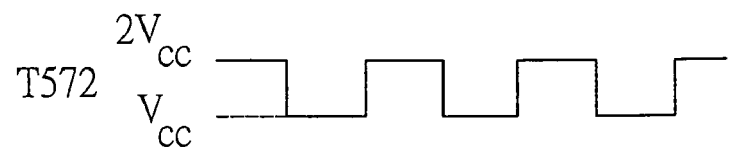
FIG. 10 shows wave forms of control signals for the charge pump circuit in FIG. 9.
Figure 10:
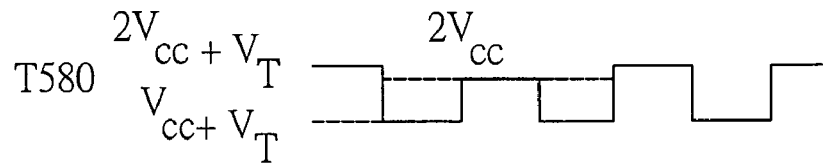
Figure 10:
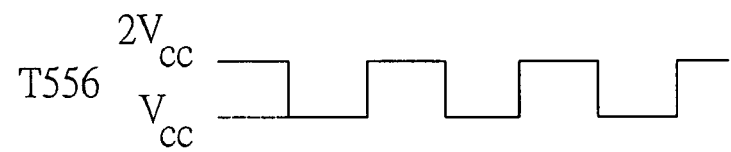
Figure 10:
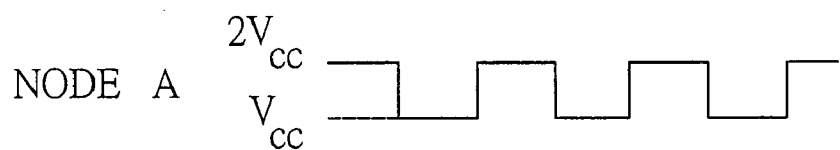
Figure 10:
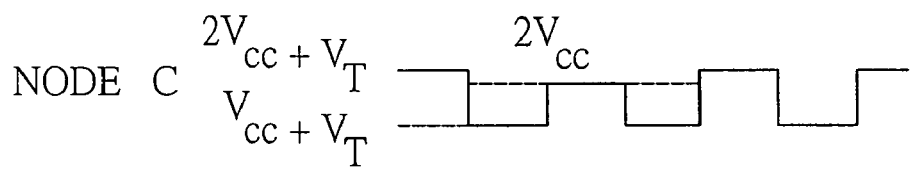
Figure 10:

As shown in FIG. 8, the single-stage charge pump circuits 200, 300 in FIGS. 5 and 6 can be connected in series to form a multi-stage circuit for providing a negative output voltage. The first-stage charge pump circuit 200 uses the circuit in FIG. 5. In the subsequent stages, the circuit in FIG. 6 is employed. Finally, the output voltage VBB=−N×VDD.

In summary, the disclosed two-phase charge pump circuit uses a mixed structure of NMOS and PMOS charge/discharge transistors and output transistors. Both ends of the body of each charge/discharge transistor are connected to two switches also comprised of NMOS or PMOS transistors. Using appropriate control signals, one of the switches is on so that the NMOS and PMOS charge/discharge transistor or the body of the output transistor can be constantly switched to a lower voltage level (for the NMOS transistors) or a higher voltage level (for the PMOS transistors). As the voltage of the body can be effectively controlled, the body effect can be avoided.

What is claimed is:

1. A two-phase charge pump circuit without the body effect that receives a first input signal and a second input signal of opposite phases, the charge pump circuit comprising:

a first voltage dropping stage, which includes a first NMOS discharge transistor and a third NMOS discharge transistor, each of which having a body, a gate, a first terminal, and a second terminal, the body of the first NMOS discharge transistor being connected to two switches, the first terminal and the second terminal of the first NMOS discharge transistor being connected respectively to a first control node and an input node, the first terminal and the second terminal of the third NMOS discharge transistor being connected respectively to the first control node and the input node, the gate of the third NMOS discharge transistor is connected to the second control node, and the body of the third NMOS discharge transistor is connected to the body of the first NMOS discharge transistor;

a second voltage dropping stage, which includes a second NMOS discharge transistor and a fourth NMOS discharge transistor, each of which having a body, a gate, a first terminal, and a second terminal, the body of the second NMOS discharge transistor being connected to two switches, the first terminal and the second terminal of the second NMOS discharge transistor being connected respectively to a second control node and the input node, the first terminal and the second terminal of the fourth NMOS discharge transistor being connected respectively to the second control node and the input node, the gate of the fourth NMOS discharge transistor is connected to the first control node, and the body of the fourth NMOS discharge transistor is connected to the body of the second NMOS discharge transistor;

an input stage, which includes two NMOS discharge transistors connected in series with their connecting node being the input node, the body of each NMOS discharge transistor being connected to two switches with one end of the fifth NMOS discharge transistor connected to a third control node and one end of the sixth NMOS discharge transistor connected to a fourth control node; and a negative-voltage generator, which includes two NMOS output transistors, the body of each of the NMOS output transistors being connected to two switches with one end of the first NMOS output transistor connected to the third control node and one end of the second NMOS output transistor being connected to the fourth control node, and the other ends of the two NMOS output transistors being connected to an output node;

wherein the first input signal and the second input signal are provided to the first voltage dropping stage and the second voltage dropping stage, respectively, the two switches of the first voltage dropping stage, the two switches of the second voltage dropping stage, and the four switches of the input stage are controlled by the voltage on the first control node or the second control node so that the bodies of the first/third NMOS discharge transistor and the second/fourth NMOS discharge transistors are constantly switched to a lower voltage level.

2. The two-phase charge pump circuit without the body effect as claimed in claim 1, wherein the two switches connected to the body of the first/third NMOS discharge transistor are first NMOS switch and second NMOS switch;

the two switches connected to the body of the second/fourth NMOS discharge transistor are third NMOS switch and fourth NMOS switch;

the two switches connected to the body of the fifth NMOS discharge transistor in the input stage are fifth NMOS switch and sixth NMOS switch; and the two switches connected to the body of the sixth NMOS discharge transistor are seventh NMOS switch and eighth NMOS switch.

3. The two-phase charge pump circuit without the body effect as claimed in claim 2, wherein the first terminal and the gate of the first NMOS discharge transistor are connected to a first capacitor to form the first control node, and the other end of the first capacitor is connected to the first input signal;

the bodies and first terminals of the first NMOS switch and the second NMOS switch are connected to the body of the first NMOS discharge transistor, with the second terminal of the first NMOS switch connected to the first control node and the second terminal of the second NMOS switch connected to the input node;

the first terminal and the gate of the second NMOS discharge transistor are connected to a second capacitor to form the second control node, and the other end of the second capacitor is connected to the second input signal;

the bodies and first terminals of the third NMOS switch and the fourth NMOS switch are connected to the body of the second NMOS discharge transistor, with the second terminal of the third NMOS switch connected to the second control node and the second terminal of the fourth NMOS connected to the input node; and the gates of the first NMOS switch and the fourth NMOS switch are connected to the second control node, and the gates of the second NMOS switch and the third NMOS switch are connected to the first control node.

4. The two-phase charge pump circuit without the body effect as claimed in claim 3, wherein the gate of the fifth NMOS discharge transistor is connected to the first control node, the first terminal of the fifth NMOS discharge transistor is connected to a third capacitor to form the third control node and the other end of the third capacitor is connected to the first input signal, and the second terminal of the fifth NMOS discharge transistor is connected to the input node;

the gate of the sixth NMOS discharge transistor is connected to the second control node, the first terminal of the sixth NMOS discharge transistor is connected to a fourth capacitor to form the fourth control node and the other end of the fourth capacitor is connected to the second input signal, and the second terminal of the sixth NMOS discharge transistor is connected to the input node;

the first terminals and the bodies of the fifth NMOS switch and the sixth NMOS switch are connected to the body of the fifth NMOS discharge transistor, with the gate of the fifth NMOS switch connected to the second control node and the gate of the sixth NMOS switch connected to the first control node; and the first terminals and the bodies of the seventh NMOS switch and the eighth NMOS switch are connected to the body of the sixth NMOS discharge transistor, with the gate of the seventh NMOS switch connected to the first control node and the gate of the eighth NMOS switch connected to the second control node.

5. The two-phase charge pump circuit without the body effect as claimed in claim 4, wherein the gate of the first NMOS output transistor in the negative-voltage generator is connected to the fourth control node and the two switch gates connected to the first NMOS output transistor are connected to the third control node and the fourth control, respectively; and the gate of the second NMOS output transistor in the negative-voltage generator is connected to the third control node and the two switch gates connected to the second NMOS output transistor are connected to the third control node and the fourth control, respectively.

* * * * *